(12) United States Patent
Norum

(10) Patent No.: US 10,305,906 B1
(45) Date of Patent: May 28, 2019

(54) ACCESS HEARTBEAT FOR A HARDWARE SECURITY MODULE

(71) Applicant: Amazon Technologies, Inc., Seattle, WA (US)

(72) Inventor: Steven Preston Lightner Norum, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 15/264,462

(22) Filed: Sep. 13, 2016

(51) Int. Cl.
*H04L 9/00* (2006.01)
*H04L 29/06* (2006.01)
*H04L 9/32* (2006.01)

(52) U.S. Cl.
CPC ............ *H04L 63/10* (2013.01); *H04L 9/3247* (2013.01); *H04L 63/06* (2013.01); *H04L 63/08* (2013.01)

(58) Field of Classification Search
CPC ...................................................... H04L 63/10
See application file for complete search history.

(56) References Cited

U.S. PATENT DOCUMENTS

| | | | |
|---|---|---|---|
| 9,426,154 B2 | 8/2016 | Fitzgerald et al. | |
| 2013/0339736 A1* | 12/2013 | Nayshtut | H04L 63/08 713/170 |
| 2014/0164776 A1* | 6/2014 | Hook | H04L 9/14 713/171 |
| 2014/0282936 A1* | 9/2014 | Fitzgerald | H04L 63/10 726/6 |
| 2016/0315778 A1* | 10/2016 | Le Saint | H04L 9/3234 |
| 2017/0351879 A1* | 12/2017 | Sion | G06F 21/87 |

\* cited by examiner

*Primary Examiner* — Alexander Lagor
*Assistant Examiner* — Syed M Ahsan
(74) *Attorney, Agent, or Firm* — Robert C. Kowert; Meyertons, Hood, Kivlin, Kowert & Goetzel, P.C.

(57) ABSTRACT

Systems, devices and processes are described for implementing an access heartbeat role on a hardware security module (HSM) that stores secure data on behalf of a secure data owner. Heartbeat and access credentials are established and distributed by the HSM. Access to the secure data is prevented unless the HSM receives valid heartbeats prior to a time expiration along with a valid access request. Generally, heartbeats are signed messages and include heartbeat credentials. Access requests may also be signed messages and include access credentials. The access credentials may be suspended, revoked or the entire HSM may be zeroized (e.g., plaintext keys erased), dependent upon a failure to receive valid heartbeats in a timely fashion. Heartbeats may be required from multiple entities, in some embodiments. Some example configurable features include heartbeat expiration time, the source of the credentials, the access denial options, and how many sources of distinct heartbeats are required.

20 Claims, 9 Drawing Sheets

```
                    account no. XXZZYY
Hardware Security Module Heartbeat Configuration Heartbeat expiration time period
   802      ●specify period in heartbeat message
   804      ○set time period  [▽   45 sec.   ]

Crypto-user credential options
   806      ●Select credentials provided by crypto user  [▽        ]
   808      ○Generate by HSM and provide to secure data owner
   810      ○Generate by HSM and provide to crypto user  [ identifier ]

Heartbeat Failure Options
   812      ○Suspend access threshold     [▽        ]
   814      ●Revoke credentials threshold  [▽        ]
   816      ○Zeroization configuration     [▽        ]

Multi-party Options
   817   ●  Multiparty heartbeat
     818      ○No. of parties    [▽        ]
     819      ○Failure options   [▽        ]
```

*FIG. 8*

ACCESS HEARTBEAT FOR A HARDWARE SECURITY MODULE

BACKGROUND

Hardware security modules are a desirable service feature of cloud-based systems and services. In some instances, despite a preference to restrict access to secure data, operation of the hardware security modules may require exposing limited access credentials to the service provider. For instance, access credentials for accessing the hardware security module may need to be provided to a service provider service (or service operated by the service provider on behalf of some customer) that makes use of the secrets stored in the secure data store of the hardware security module. A user of the hardware security module may give limited access credentials to the service provider process, but at least without physical access to the hardware security device, the user has no way to revoke those credentials, leaving the access to secrets stored by the secure storage susceptible. For example, if the service provider cuts the user's access, the service provider process will still have access to the hardware security module until the credentials expire (a disconnected user is unable to revoke the access credentials provided to the service provider).

Short-lived (e.g., extremely short-lived) credentials may be used, but they would need to be continually sent to the service provider by the user, and sending the credentials is both inconvenient and adds the risk of potential exposure of the credentials.

BRIEF DESCRIPTION OF DRAWINGS

FIG. 8 illustrates a user interface for configuring features associated with a hardware security module that implements a heartbeat restriction for accessing secure data of the hardware security module.

Figure 1:
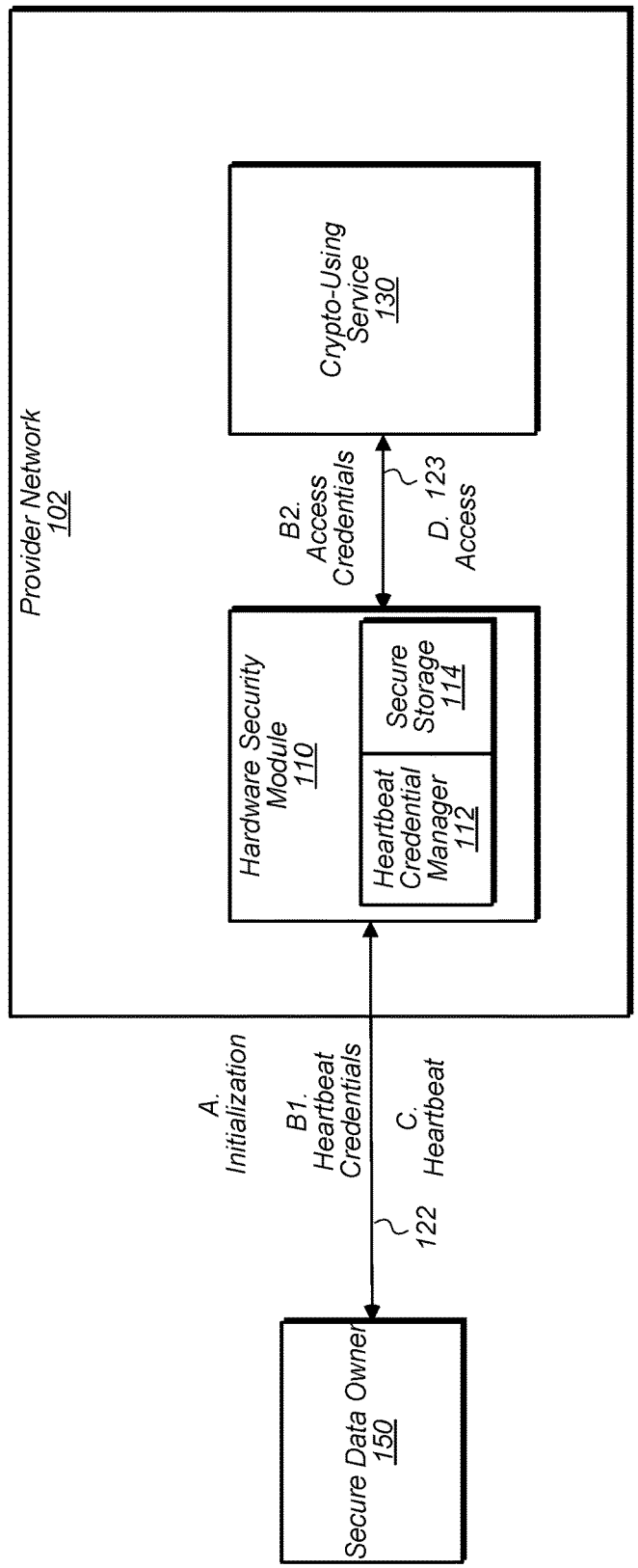
FIG. 1 depicts a hardware security module environment that implements a heartbeat restriction for accessing secure data of the hardware security module, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and systems provide a secure way to both grant access to a hardware security module, but also be able to revoke that access in a relatively short period of time. A hardware security module is provided that allows one user to instruct the device to grant another user access to permissions for a short period of time. After that period of time, unless a new authorization message (e.g., a "heartbeat") is received by the hardware security module, the other user may be locked out or the device may zeroize (e.g., erase plaint text keys).

In some embodiments, an entity (e.g., a secure data owner) or a process creates a heartbeat-required role on a hardware security module. In return, the entity or process receives a set of credentials (e.g., access credentials for accessing the hardware security module) corresponding to that role, along with another set of credentials corresponding to the heartbeat for that role (e.g., heartbeat credentials). The entity or process may send the access credentials to another entity or process (e.g., the service provider or a service provided by the service provider) that uses the access credentials to access the secrets in the secure storage of the hardware security module. In some embodiments, the service provider may provide access credentials that are entered at role creation time (e.g., either in the form of a password or a public key). To send a heartbeat message, the entity (e.g., the security officer user) sends a timestamped message to the hardware security module, in embodiments. The message may be signed using heartbeat credentials.

There may be a predefined (e.g., configurable or default) heartbeat period, or each heartbeat message may include an expiration time (e.g., a time by which the next heartbeat must be received). Upon receiving the next heartbeat, the heartbeat time threshold may be reset (e.g., according to the default or according to an expiration time sent in the message). The hardware security module generally allows access via the access credentials as long as the heartbeat time threshold does not expire without receiving a valid heartbeat message, in embodiments. Heartbeat messages may be sent to the hardware security module periodically (e.g., every X seconds/minutes, etc.). In some instances, if some defined period of time passes without the hardware security module receiving a signed heartbeat message, the hardware security module suspends or revokes the access credentials, or may zeroize.

In some instances, heartbeats from multiple parties may be required for access. For instance, multiple different users (e.g., secure data owners) may be required to send heartbeat messages to the hardware security module to allow access to the hardware security module. For instance, heartbeat messages may be required from devices of users in different governments, different research entities, etc. Some such configurations may prevent any single entity from seizing the heartbeat credentials to keep the hardware security module available.

In embodiments, (e.g., non-service provider environments) a heartbeat-based hardware security module could be used to manage network outages that coincide with compromised access credentials such that the network outage does not leave the hardware security module vulnerable during the outage.

Figure 3:
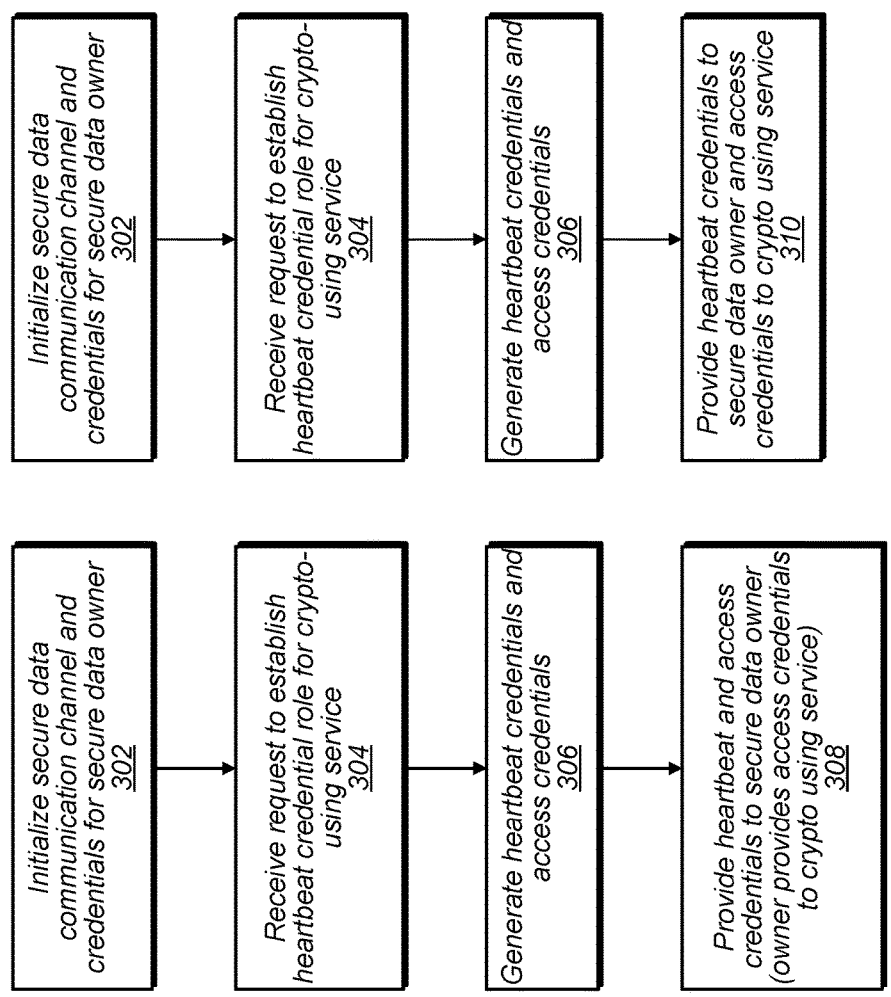
FIGS. 3A/3B depict a process diagram illustrating initialization and setup of the environment for a hardware security module that implements a heartbeat restriction for accessing secure data of the hardware security module, according to at least some embodiments.

FIG. 1 depicts a hardware security module environment that implements a heartbeat restriction for accessing secure data of the hardware security module, according to at least some embodiments. Generally, the functionality and processes described herein (e.g., FIGS. 3A/3B, 4, 5, 6 and 7) may be performed by one or more of the features illustrated in FIG. 1. While FIG. 1 is illustrated in the environment of provider network 102, it is contemplated that that features illustrated in FIG. 1 may perform functionality described herein in other environments, such as in an enterprise environment, for example, without departing from the scope of the disclosure.

Figure 2:
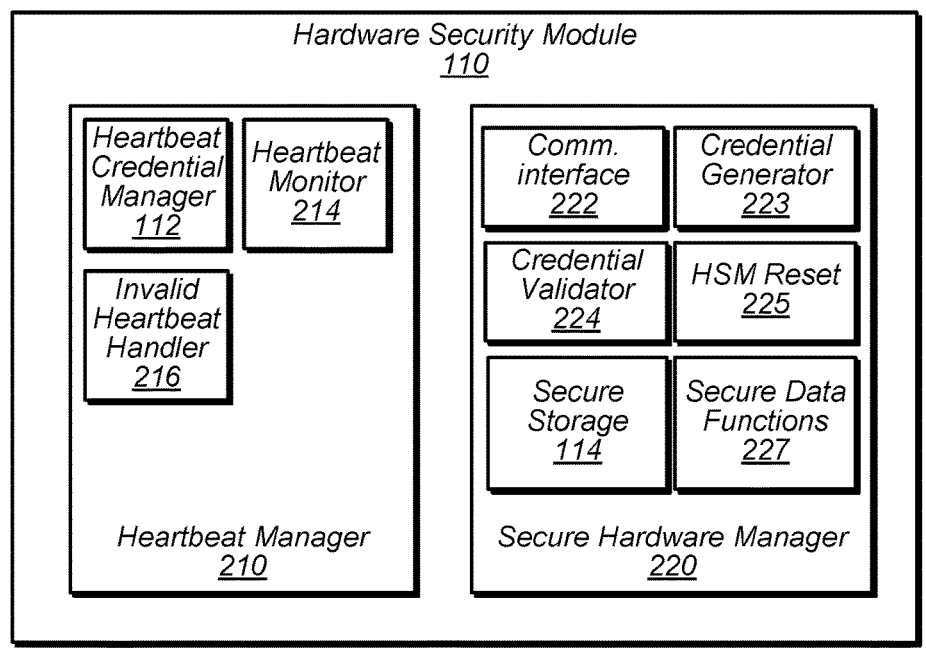
FIG. 2 depicts implementation of a hardware security module that implements a heartbeat restriction for accessing secure data of the hardware security module, according to at least some embodiments.

FIG. 2 depicts implementation of a hardware security module that implements a heartbeat role for controlling access to secure data of the hardware security module, according to at least some embodiments. Various components of the hardware security module 110 may perform some or all of the functionality described herein (e.g. functionality depicted in the process diagrams of FIGS. 3A/3B, 4, 5 and 7). It is contemplated that some embodiments may include additional or fewer components than those depicted. In some embodiments various components may perform functionality to the exclusion of other components.

Generally, it is contemplated that the depicted components may be arranged differently from the particular illustrated embodiments, that other components (not necessarily illustrated herein) may perform one or more of the steps described herein, and that at least some of the steps may be performed in a different order or not at all, without departing from the scope of the invention. Although some embodiments include processes and components within a provider network 102 that provides one or more services (e.g., a storage service, or a compute service) to numerous distinct clients, each client including a distinct network of one or more client devices, processes and components described herein may also be configured within an enterprise network to service accesses from clients within the enterprise network, in some embodiments.

FIGS. 3A/3B depict a process diagram illustrating initialization and setup of the environment for a hardware security module that implements a heartbeat restriction for accessing secure data of the hardware security module, according to at least some embodiments.

FIG. 1 illustrates that an external user or entity (e.g., secure data owner 150) and a hardware security module 110 go through an initialization process A. The initialization process may correspond to block 302 of FIGS. 3A and 3B, that describes initialization of a secure data communications channel and initialization of credentials for the secure data owner 150 (e.g., an external customer). The external user may be external to the provider network 102, such as a customer of a number of customers of the provider network, in embodiments. The initialization process may include establishing a secure channel over a network 122 between the external user and the hardware security module 110 (e.g., via PKI). For instance, the communication interface 222 of the secure hardware manager depicted in FIG. 2 may implement the secure channel, in embodiments. In some embodiments, the secure data stored in the secure storage 114 of the hardware security module 110 may be an encryption key (e.g., from PKI). In embodiments, the external user may provide the encryption key over the secure channel to the hardware security module that stores the encryption key or the hardware security module may generate the encryption key. Other forms of initialization of a communication channel over network 122 are contemplated without departing from the scope of this disclosure.

B1 of FIG. 1 illustrates that heartbeat credentials are established. In the depicted embodiment, the secure data owner requests creation of a heartbeat-based role on the hardware security module (HSM). In the depicted embodiment, the hardware security module 110 receives a request to establish a heartbeat credential for a crypto-using process (or service) 130 from the secure data owner 150 (e.g., block 304 of FIG. 3A/3B). In some embodiments, a credential generator 223 of the secure hardware manager 220, or the heartbeat credential manager 112 of the heartbeat manager 210 may generate heart beat credentials (e.g., block 306 of FIG. 3A/3B). The hardware security module provides the heartbeat credentials to the external user (e.g., secure data owner 150) over communication channel 122 (e.g., blocks 308/310 of FIGS. 3A/3B).

Access credentials may be established (e.g., generated by the credential generator 223 as illustrated in block 306 of FIG. 3A/3B). In some instances, the access credentials may be obtained from an initialization process with the crypto-using service (or process) 130, established by the secure data owner 150, or obtained from predefined credentials of some other system, for example. A crypto-using service 130 may be any service, process or the like that makes use of the cryptographic functionality (e.g., secure data functions 227) provided by the hardware security module 110. B2 of FIG. 1 illustrates that access credentials are provided to the crypto-using process 130. For instance, in the depicted embodiment, the hardware security module provides the access credentials to the crypto-using service (block 310 in FIG. 3B). In other embodiments, the hardware security module 110 provides the access credentials to the secure data owner 150, and the secure data owner 150 provides the access credentials to the crypto-using service 130 (block 308 of FIG. 3A). For instance, the secure data owner 150 may provide the access credentials to the crypto-using service via a distinct channel (e.g., via some distinct application such as e-mail or some interface to the crypto-using service 130, via some other communication channel such as via telephone or another distinct data channel, etc.).

Figure 4:
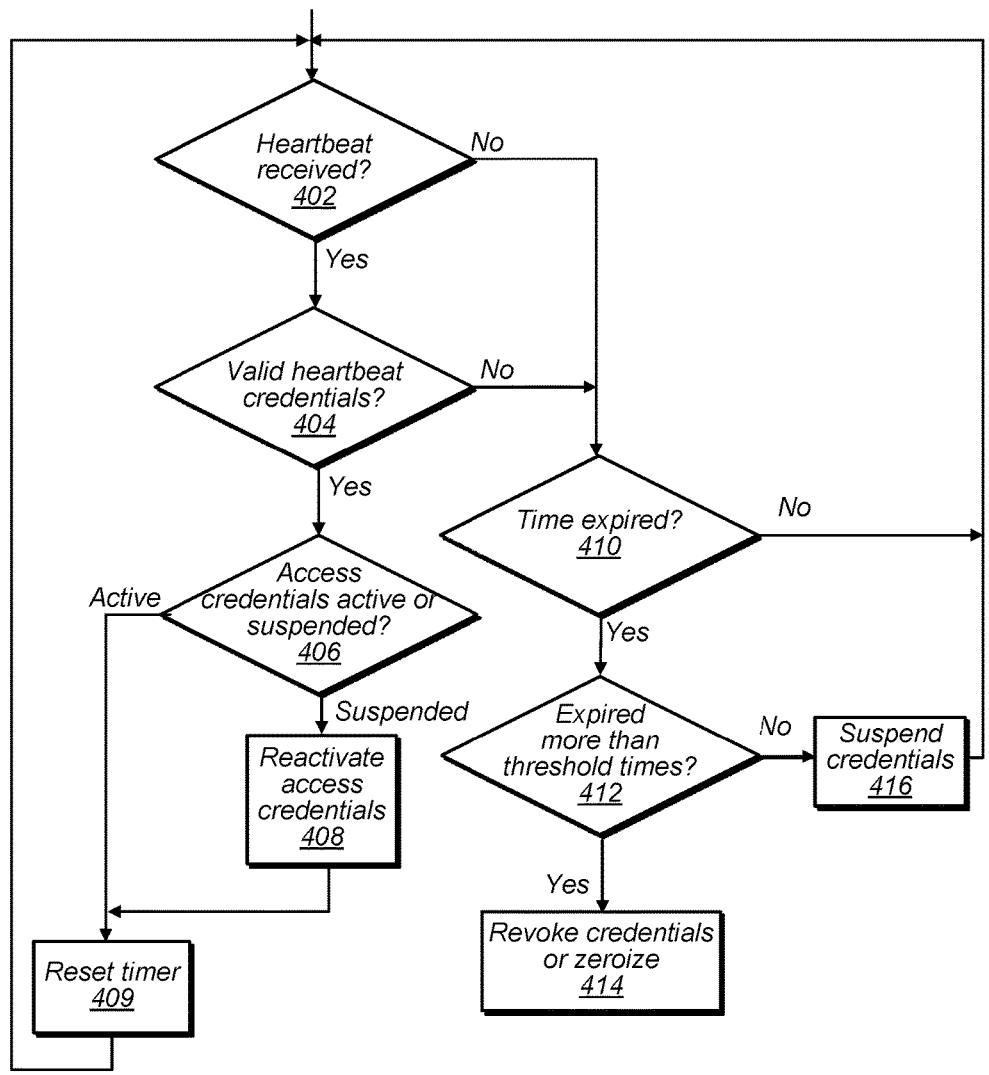
FIG. 4 illustrates a process diagram illustrating the heartbeat access control flow for a hardware security module that implements a heartbeat restriction for accessing secure data of the hardware security module, according to at least some embodiments.

FIG. 4 illustrates a process diagram illustrating the heartbeat access control flow for a hardware security module that implements a heartbeat restriction for accessing secure data of the hardware security module, according to at least some embodiments. In the illustrated embodiment, the external user (e.g., the secure data owner 150) sends, subsequent to initialization, a heartbeat message to the hardware security module 110 (FIG. 1, C). In embodiments, the heartbeat message may be signed (e.g., with the heartbeat credentials). As illustrated in block 402, the hardware security manager (e.g., the heartbeat monitor 214) determines whether the heartbeat has been received. For received heartbeats, the validity of the heartbeat credentials is checked (block 404). In some embodiments, the credential validator 224 of the secure hardware manager 220 validates the credentials. In some instances, the heartbeat monitor may verify the validity of the signature of the signed message. The heartbeat security module may perform a number of different checks at this point. For example, it may check to verify that this heartbeat has not already been received (e.g., to fend of replay attacks). If the heartbeat credentials are valid (block 404, yes) the current state of the access credentials is checked (406). For suspended access credentials, receipt of a valid heartbeat may result in reactivation of the access credential (block 408). In either case (active access credentials, or reactivated credentials) the timer is reset (409) and the process starts over again at 402.

As illustrated at block 402 (*no*) and block 404 (*no*), if the heartbeat message is not received or is invalid (e.g., the signature cannot be verified, the heartbeat is a replay, etc.) the heartbeat security module determines whether the heartbeat time period has expired (block 410). If the time has not expired (410, no), the process returns to 402. If the time has expired (410, yes), a check is performed to determine whether the heartbeat expiration has expired without a valid heartbeat some threshold number of times (block 412). The threshold may be a default or configurable parameter in embodiments. If the threshold has been met (412, yes) the access credentials may be revoked or the entire hardware security module may zeroize (block 414). If the threshold has not been met (block 412, no), the credentials may be suspended (block 416) and the process may start over at block 402.

In some embodiments, an invalid heartbeat message may prevent access (e.g., the access credentials may be revoked or the HSM may zeroize if an expired heartbeat threshold is met. The invalid heartbeat monitor 216 of the heartbeat manager 210 may handle the various states of access such as temporary suspensions or revocation of credentials (e.g., as illustrated in the state diagram in FIG. 5, described below). In at least the illustrated embodiment, the hardware security module reset (HSM reset 225) may zeroize the hardware security module.

Figure 5:
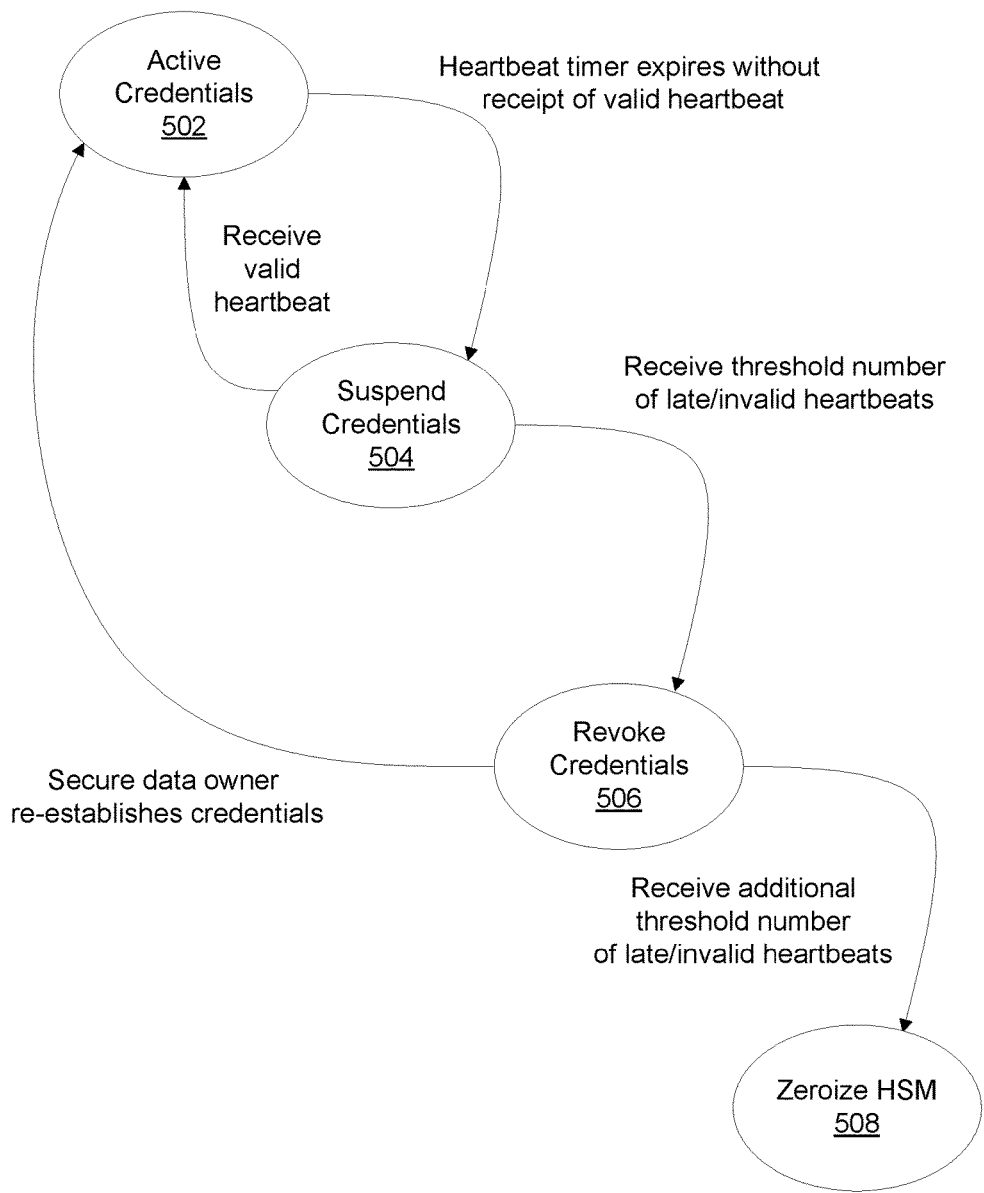
FIG. 5 illustrates a state diagram of a hardware security module that implements a heartbeat restriction for accessing secure data of the hardware security module, according to at least some embodiments.

FIG. 5 illustrates a state diagram of a hardware security module that implements a heartbeat-based control for accessing secure data of the hardware security module, according to at least some embodiments. As explained above with regard to the features depicted in FIGS. 1-4, the credentials used by the hardware security module 110 may be in any of various states (e.g., no heartbeat received, suspended credentials, revoked credentials, etc.).

As explained above with regard to FIGS. 2, 3A/3B and 4, the hardware security module (HSM) may obtain heartbeat credentials and access credentials (e.g., via generation by the HSM, via a negotiation with another entity, by configuration, etc.). FIG. 5 illustrates that the credentials may be in various states and further illustrates example triggers that may alter the state of the credentials, in embodiments.

For instance, block 502 illustrates an active credential state, such as when the access credentials and the heartbeat credentials have been generated and provided to their respective entities. Block 504 illustrates that the access credentials may transition to a suspended state (e.g., a temporary suspended state) when the heartbeat expiration expires without receipt of a valid heartbeat, for example. FIG. 5 illustrates that suspended access credentials may transition back to active credentials, if a valid heartbeat is received, in embodiments.

Credentials may be revoked (e.g., block 506) such as when the HSM has received a threshold number of late or invalid heartbeats. New, active credentials (block 502) may be established from this state, when a secure data owner re-establishes the credentials for instance. In embodiments, the HSM reset 225 may zeroize the HSM (block 508) such as when an additional threshold number of late or invalid heartbeats are received.

Figure 6:
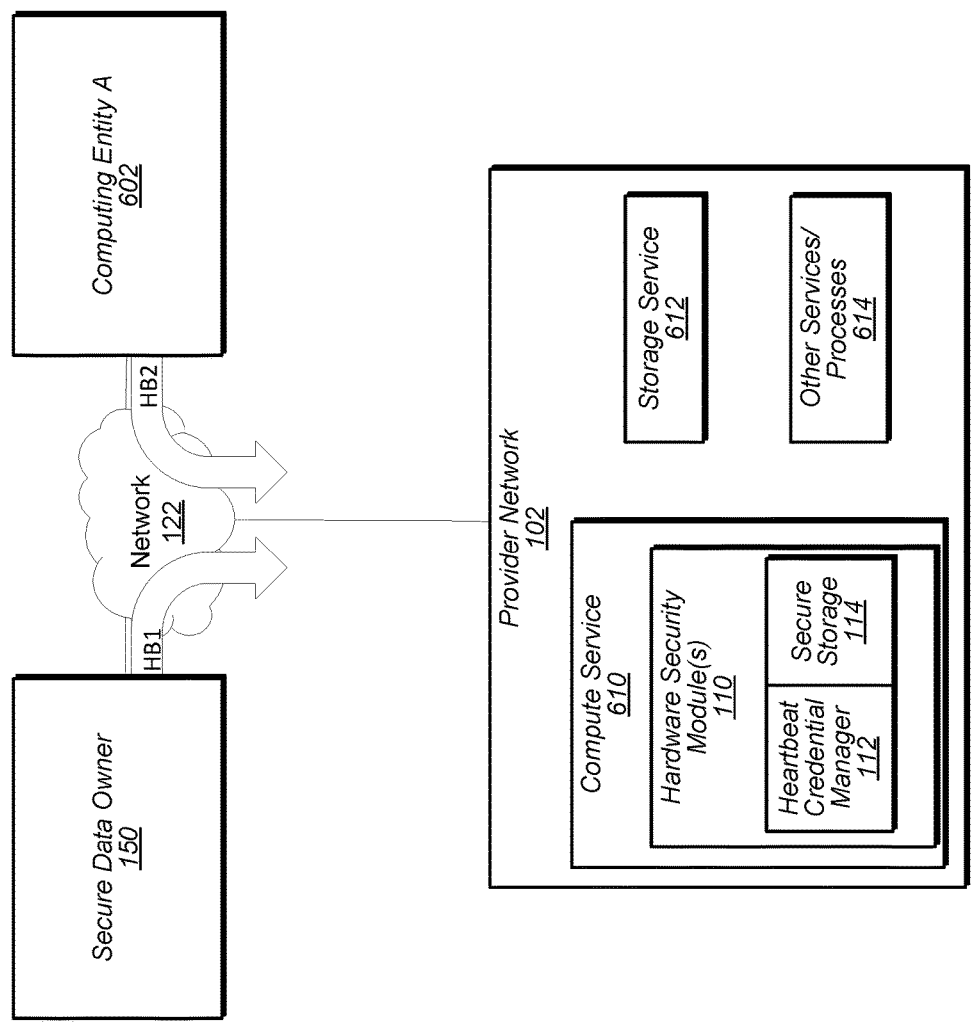
FIG. 6 illustrates a multi-party system environment of a hardware security module that implements a heartbeat restriction for accessing secure data of the hardware security module, according to at least some embodiments.
Figure 7:
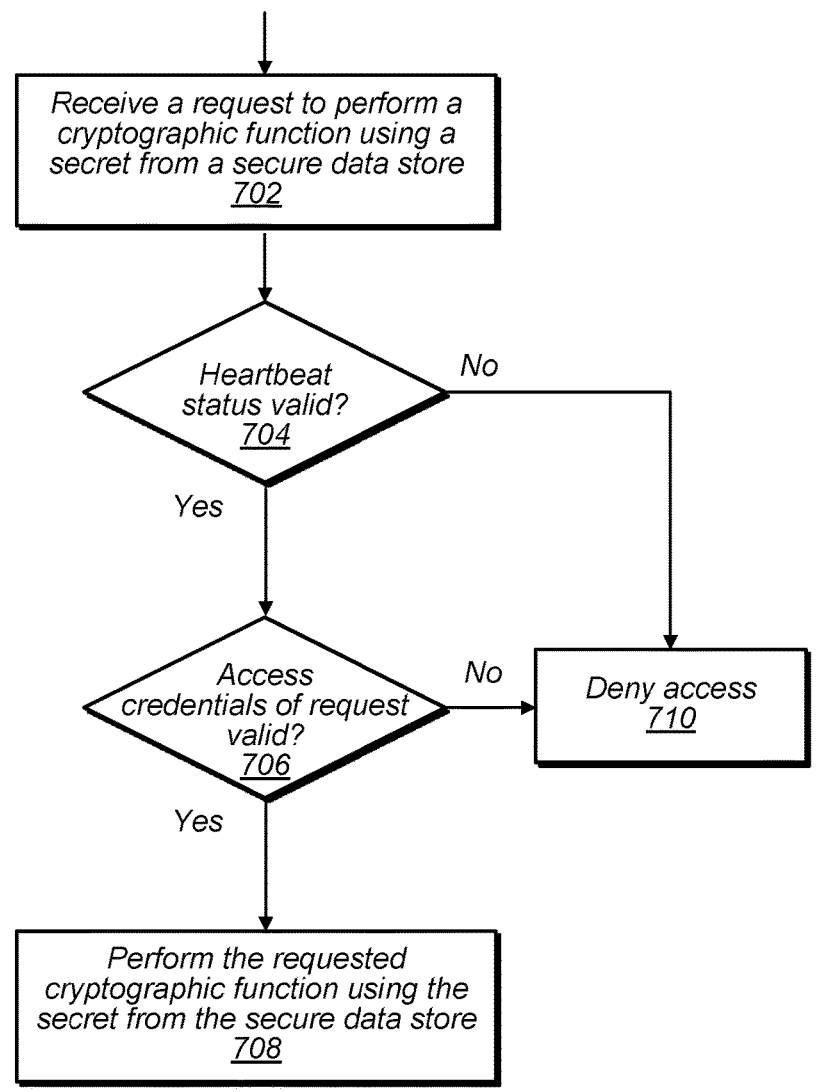
FIG. 7 illustrates a process diagram depicting a response of a hardware security module to an access request, in accordance with various embodiments.

FIG. 6 illustrates a multi-party system environment of a hardware security module that implements a multi-party heartbeat restriction for accessing secure data of the hardware security module, according to at least some embodiments. Features of the environment depicted in FIGS. 1 and 6 may perform elements of the process depicted in FIG. 7. FIG. 7 illustrates a process diagram depicting a response of a hardware security module to an access request, in accordance with various embodiments. Portions of FIG. 7 (e.g., heartbeat status valid? 704, access credentials of request valid? 706) are expanded upon in FIG. 4, for some embodiments.

FIG. 6 illustrates a service provider network 102 that provides various services such as compute service 610, storage service 612, and other services or processes 614. In the depicted embodiment, the compute service 610 includes hardware security module(s) 110 that are provided as a service by the service provider. FIG. 6 also depicts secure data owner 150 and computing entity A 602, that are each distinct entities, external to the provider network. In some embodiments, one or more of the multiple parties may be part of one or more provider networks (not illustrated).

In at least the depicted embodiment, hardware security module 110 receives a heartbeat (HB1) from secure data owner 150 and another distinct heartbeat (HB2) from computing entity A 602 over network 122. The heartbeats (HB1 and HB2) each include distinct heartbeat credentials, in embodiments. Secure data owner 150 and computing entity A may be assigned two different roles organized within a single customer of the service provider (e.g., a security officer and an engineer of the same single enterprise). In some embodiments, the secure data owner 150 and the computing entity A may be assigned distinct roles at distinct entities (e.g., for a coordinated project between two entities such as research facilities, government entities, etc.). The hardware security module 110 may be configured to require receipt of both heartbeats (HB1 and HB2) within the heartbeat expiration time period and with valid respective heartbeat credentials; otherwise the access credential(s) may be suspended or revoked, as described herein. In some embodiments, each respective heartbeat (HB1 and HB2) may be associated with their own distinct expiration period (e.g., when expirations are delivered in the heartbeats). It is contemplated that processes associated with the storage service 612, compute service 610 or other services/processes 614 may be provided with the access credentials to access the secret data in the secure data store of the hardware security module 110 (e.g., as long as valid heartbeats from the multiple parties continue to be received).

FIG. 7 illustrates a process diagram depicting a response of a hardware security module to an access request, in accordance with various embodiments. The hardware security module (HSM) is illustrated as receiving a request to perform a cryptographic function using a secret from a secure data store of the HSM (block 702). For example, one or more services of a service provider (operating on behalf of a service provider customer or otherwise) may send such a request to an HSM. In some embodiments the request (or another subsequent request) may include data or a location of data that is to have a cryptographic operation performed on it by the HSM using the secret.

As illustrated at block 704, the HSM determines whether the heartbeat status is valid. For example, FIG. 4 provides examples of determining the heartbeat status. Access may be denied (710) for an invalid heartbeat status (704, no). Validity of the access credentials of the request is also determined (block 706) in the depicted embodiment. If both the heartbeat status and the access credentials are valid, the requested cryptographic function is performed using the secret from the secure data store (block 708).

FIG. 8 illustrates a user interface for configuring features associated with a hardware security module that implements a heartbeat restriction for accessing secure data of the hardware security module. Illustrated are configurable settings, some of which are applicable to features illustrated in FIGS. 1-7, described above.

For instance, FIG. 8 illustrates a user interface that is particular to an account no. XXZZYY. In some embodiments, the account may be a customer account of a service provider that provides a number of different services to a number of different customers, each customer with a distinct customer network serving a number of client devices of the customer. The account may be an account particular to the hardware security module (e.g., an account associated with a hardware security service), in embodiments. In some embodiments, the account may be associated with another service (e.g., another service of the service provider or a customer's service). In some embodiments, configurations for more than one set of credentials per account may be performed. For instance, a secure data owner 150 may provide heartbeat-based access to secure data in a heartbeat security module for number of different services, each service using a different set of credentials.

FIG. 8 illustrates a configurable heartbeat expiration time period. The heartbeat expiration time period is generally a period of time during which a heartbeat is expected to be received. Generally, if a valid heartbeat message is not received during this period of time or by the expiration time, access may be prevented (e.g., access credentials suspended, revoked, etc.). Item 802 illustrates that the heartbeat expiration time period may be configured such that it is specified within the heartbeat messages. For instance, each heartbeat may include specification of an expiration time for the next heartbeat (e.g., the period between expirations may be the same or different for each message). In some embodiments, an expiration period may be sent in only some of the heartbeats, with the heartbeat period remaining the same as for the prior heartbeat for heartbeats that do not specify an expiration. Item 804 illustrates that, instead of specifying an expiration in each heartbeat, the heartbeat expiration time period may be set as a configurable parameter.

FIG. 8 also illustrates configurable settings for crypto-user credential options (various credential options were also illustrated in FIGS. 3A/3B, described above). For instance, in some embodiments, the hardware security module may be configured to use credentials provided by the crypto-using service as illustrated at 806 (e.g., selectable, pre-existing credentials of a service provider system or of a customer account with a service provider service, etc.) or to use credentials generated by the hardware security module (HSM) and provide them to the secure data owner (item 808). The secure data owner may provide the access credentials to a crypto-using process (e.g., via an alternative communication channel). Another option may be to generate the credentials by the HSM and provide the access credentials directly to the crypto-using process (item 810). The user interface may provide a graphical user interface element to enter an electronic address or other identifier for as a target for the generated credentials.

Item 812 of FIG. 8 illustrates that a configurable heartbeat failure option may be to deny (e.g., suspend) access when an invalid heartbeat has been received, or if the time expires without receiving a heartbeat (illustrated in FIG. 5). Item 814 illustrates a threshold associated with revocation of the credentials may be configurable (the threshold is illustrated in FIG. 5). For instance, if credentials have been suspended due to reaching the first threshold number of late/invalid heartbeats, the credentials might be revoked altogether if some additional number of late/invalid heartbeats are received. Item 816 illustrates configuration of the zeroization option that may be associated with yet another configurable threshold (the additional threshold is illustrated in FIG. 5).

Item 817 of FIG. 8 illustrates configurable options for a multi-party heartbeat. For instance, the number of parties may be specified (item 818) and failure options may be set (item 819). For instance, revocation may be determined based on failing to receive a valid heartbeat from a subset of the multiple parties.

In some instances, (not necessarily limited to multi-party heartbeats) one or more access credentials may be provided to a number of different entities and the multiple access credentials may all be restricted by the heartbeat-based access restriction techniques described herein. Revocation may only apply to a subset of the entities given access credentials, in embodiments. Additional features associated with the multi-party heartbeat (e.g., an address or identifier associated with a crypto-using process, etc.) may also be configurable (e.g., via additional user interface elements, not illustrated).

A same heart-beat time threshold may be applied to each of the multi-party heartbeats, in embodiments. In some instances, one or more of the multi-party heartbeats may correspond to a heart-beat time threshold that is distinct from the heart-beat time threshold of another one of the heartbeats. For instance, HB1 received from secure data owner 150 in FIG. 6 may be required to be received by the hardware security module 110 in accordance with one heart-beat time threshold (e.g., every 30 seconds, every 10 minutes, weekly, or at a set time such as by 1 pm). HB2 may be subject to the same requirement, or to a different requirement (e.g., HB2 must be received before noon each day). In some embodiments, the heart-beat based restriction may be based on some relationship between the heartbeats. For instance, HB2 may be required to be received within 30 seconds of receipt of HB1, or access may be denied.

Illustrative System

Figure 9:
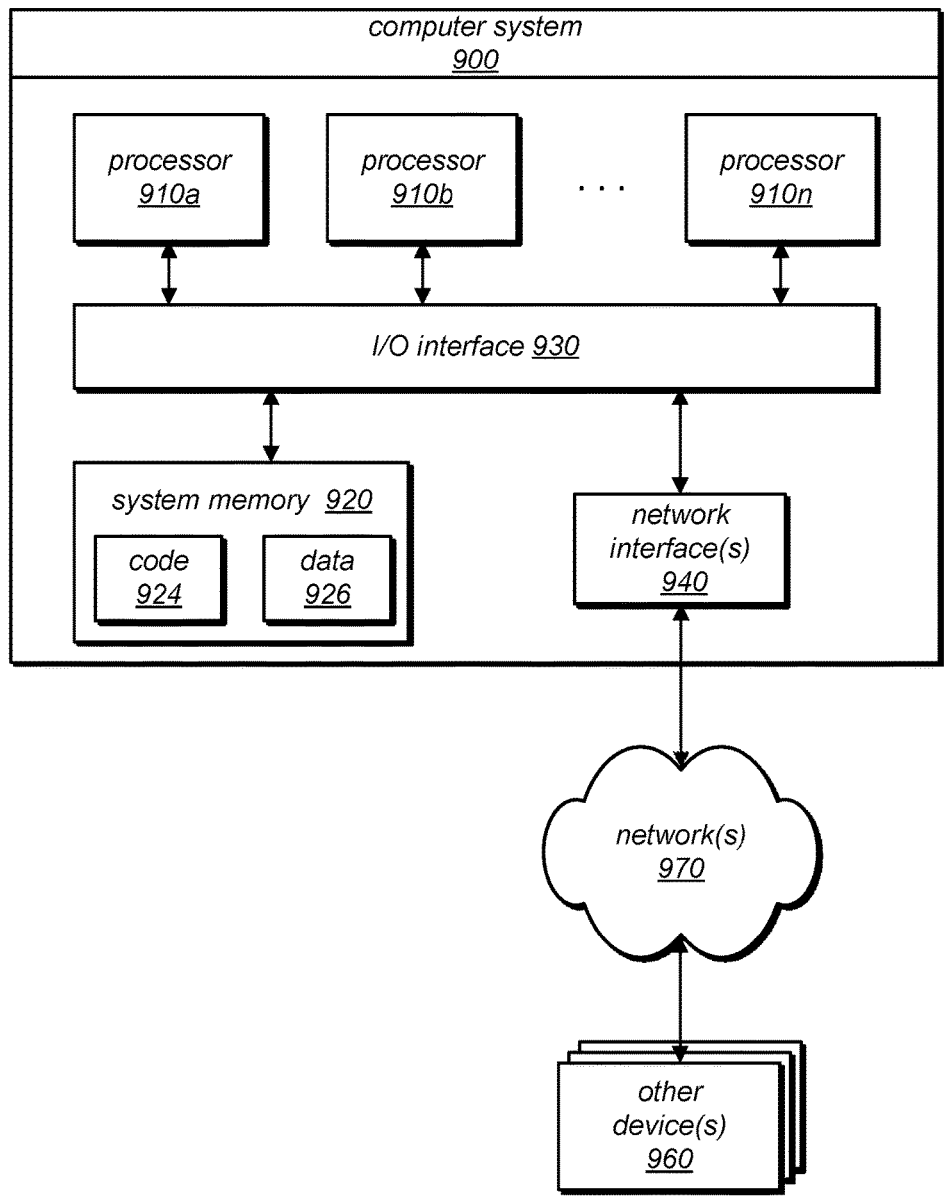
FIG. 9 is a block diagram illustrating an example computer system that may be used in some embodiments.

FIG. 9 is a block diagram illustrating an example computer system that may be used in some embodiments. In at least some embodiments, one or more servers that implement a portion or all of the hardware security module with an access heartbeat feature as described herein may include a computer system that includes or is configured to be accessed by one or more components of a system such as secure data owner 150, computing entity A 602, storage service 612, compute service 610 or, other service(s) 614, etc., for example. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for restricting access to secure data of a hardware security module via heartbeat role, are shown stored within system memory 920 as code 924 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIGS. 1 and 6, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of an access heartbeat for a hardware security module. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 740.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A service provider system, comprising:
  one or more services implemented via one or more computers, wherein the one or more services are configured to request performance of one or more cryptographic functions based at least in part on respective secure data of entities distinct from the service provider system;
  a hardware security module service configured to manage the respective secure data for the entities distinct from the service provider system, wherein the hardware security module service comprises at least one hardware security module device configured to:
    securely store secure data for a particular entity distinct from the service provider system;
    establish, on behalf of the particular entity, heartbeat credentials and access credentials distinct from the heartbeat credentials;
    receive heartbeat messages from the particular entity and validate the heartbeat messages based at least in part on the heartbeat credentials included with the heartbeat messages;
    receive, from a service of the one or more services, an access request to perform a cryptographic function based at least in part on the secure data stored in the hardware security module for the particular entity;
    determining that the access credentials received with the access request are valid;
    determine that a valid heartbeat message has been received by the hardware security module prior to expiration of a heartbeat time threshold; and perform the cryptographic function, wherein the access request is denied if the access credentials are invalid or if a valid heartbeat message has not been received by the hardware security module prior to expiration of a heartbeat time threshold.

2. The system of claim 1, wherein the at least one hardware security module is further configured to:
generate the heartbeat credentials and the access credentials in response to a request from the particular entity; and
provide both the heartbeat credentials and the access credentials to the particular entity;
wherein the hardware security module receives the access credentials from the service as part of the access request to perform the cryptographic function.

3. The system of claim 2, wherein the received heartbeat message is signed with a digital signature; and wherein to perform said determining that the heartbeat credentials received with the heartbeat message are valid, the at least one hardware security module device is further configured to verify the digital signature of the received heartbeat message.

4. The system of claim 1, wherein said denial of the access request includes suspension of the access credentials, or revocation of the access credentials.

5. The system of claim 1,
wherein the secure data stored in the hardware security module includes an encryption key that is used by the hardware security module to perform the requested cryptographic function; and
wherein the at least one hardware security module is further configured to:
obtain data on which the cryptographic function is performed;
perform the cryptographic function on the data using the encryption key; and
return a result of performing the cryptographic function on the data to the service.

6. A method, comprising
performing by a hardware security module of a service provider, wherein the hardware security module includes a secure digital data store for securely storing digital data:
receiving, from an entity external to the service provider, a request to generate a heartbeat-required role on the hardware security module;
establishing heartbeat credentials;
establishing access credentials;
providing the heartbeat credentials to the external entity;
receiving heartbeat messages from the external entity and validating the heartbeat messages based at least in part on the heartbeat credentials included with the heartbeat messages;
receiving an access request from a service of the service provider to perform a cryptographic function based at least in part on the secure data stored in the hardware security module for the external entity; and
performing the cryptographic function based at least in part on determining that the access credentials received with the access request are valid, and determining that a valid heartbeat message has been received by the hardware security module.

7. The method of claim 6, further comprising performing, by the hardware security module:

receiving another access request to perform a cryptographic function based at least in part on secure data stored in the hardware security module;
determining that the access credentials in the access request are invalid or that a valid heartbeat message has not been received by the hardware security module; and
denying performance of the cryptographic function requested in the other access request.

8. The method of claim 7, further comprising performing, by the hardware security module:
determining that a plurality of other received heartbeat messages from the external entity include invalid heartbeat credentials or are not received prior to expiration of a heartbeat time threshold; and
revoking the access credentials based at least in part on the plurality being greater than a threshold number.

9. The method of claim 8,
wherein the threshold number is a configurable parameter;
wherein the method further comprises receiving a value for the threshold number; and
wherein said revoking the access credentials is based at least in part on the plurality being greater than the received value for the threshold number.

10. The method of claim 9, further comprising performing, by the hardware security module:
receiving, from the external entity, a request to re-establish credentials for accessing the secure data stored in the hardware security module;
re-establishing the credentials;
receiving another access request to perform a cryptographic function;
determining that the access credentials received with the other access request are valid;
determining that a valid heartbeat message has been received by the hardware security module prior to expiration of a heartbeat time threshold; and
performing the cryptographic function requested in the other access request.

11. The method of claim 7,
subsequent to said suspension of the access credentials:
determining that another plurality of more received heartbeat messages from the external entity include invalid heartbeat credentials or are not received prior to expiration of a heartbeat time threshold; and
erasing, by the hardware security module, all plaintext keys based at least in part on the other plurality being greater than another threshold number.

12. The method of claim 6, further comprising:
receiving a plurality of heartbeat messages from the external entity, wherein at least some of the plurality of heartbeat messages include an expiration time period different from another expiration time period obtained from another one of the plurality of heartbeat messages, the included expiration times configuring the expiration time for a subsequent heartbeat;
receiving another access request to perform a cryptographic function; and
determining that at least one of the plurality of heartbeat messages is a valid heartbeat message that has been received by the hardware security module,
performing the cryptographic function requested in the other access request.

13. The method of claim 6, further comprising:
providing, by the hardware security module, the access credentials to the external entity, wherein the external entity provides the access credentials to the service prior to said receiving the access request to perform the cryptographic function from the service.

14. The method of claim 6, further comprising:
providing, by the hardware security module, the access credentials to the service prior to said receiving the access request to perform the cryptographic function from the service.

15. The method of claim 6, wherein establishing either of the access credentials or the heartbeat credentials includes using predefined credentials from a preexisting service for either of the heartbeat or access credentials.

16. The method of claim 6, further comprising establishing, via a communication interface, a secure channel with the external entity over a network, wherein said receiving heartbeat messages includes receiving the heartbeat messages over the secure channel.

17. A hardware security device, comprising:
a hardware security module that includes secure storage, and wherein circuitry of the hardware security module configured to:
receive a request from a requester to generate a heartbeat-required role on the hardware security module;
establish heartbeat credentials;
establish access credentials;
provide the heartbeat credentials to the requester;
receive heartbeat messages;
validating the heartbeat messages based at least in part on the heartbeat credentials included with the heartbeat messages;
receive an access request to perform a cryptographic function based at least in part on secure data stored in the secure storage;
determine that the access credentials received with the access request are valid;
determine that a valid heartbeat message has been received by the hardware security module prior to expiration of a heartbeat time threshold; and
perform the cryptographic function, wherein the access request is denied if the access credentials are invalid or if a valid heartbeat message has not been received by the hardware security module prior to expiration of a heartbeat time threshold.

18. The hardware security device of claim 17, wherein the hardware security module is further configured to:
generate the heartbeat credentials and the access credentials in response to the request; and
provide the heartbeat credentials to the requester, and the access credentials to an entity designated by the requester.

19. The hardware security device of claim 17, wherein the circuitry of the hardware security module is further configured to:
perform a plurality of secure data functions, wherein said access request to perform the cryptographic function based at least in part on the secure data stored in the hardware security module for the external entity is a request to perform one of the plurality of secure data functions.

20. The hardware security device of claim 17, wherein to establish the credentials, the hardware security module is further configured to:
establish a plurality of heartbeat credentials;
receive another access request to perform a cryptographic function based at least in part on secure data stored in the hardware security module;
determine that the access credentials received with the access request are valid;
determine that a plurality of different valid heartbeat messages, each message with distinct ones of the plurality of distinct heartbeat credentials, has been received by the hardware security module, and that each of the plurality of different heartbeat messages is received prior to expiration of a heartbeat time threshold; and
perform the cryptographic function, wherein the other access request is denied if the access credentials are invalid or if any one of the plurality of different valid heartbeat message has not been received by the hardware security module prior to the corresponding expiration of a heartbeat time threshold for that heartbeat message.

* * * * *